United States Patent [19]

Sorsche et al.

[11] 4,290,397

[45] Sep. 22, 1981

[54] MOUNTING OR ATTACHING ARRANGEMENT FOR DRIVEN OR NON-DRIVEN ASSEMBLIES ASSOCIATED WITH AN INTERNAL COMBUSTION ENGINE

[75] Inventors: Joachim H. Sorsche, Stuttgart; Erich Ableitner, Remseck; Ernst Gobien, Weinstadt; Manfred Minning, Esslingen, all of Fed. Rep. of Germany

[73] Assignee: Daimler-Benz Aktiengesellschaft, Stuttgart, Fed. Rep. of Germany

[21] Appl. No.: 79,212

[22] Filed: Sep. 26, 1979

[30] Foreign Application Priority Data

Sep. 26, 1978 [DE] Fed. Rep. of Germany ....... 2841774

[51] Int. Cl.$^3$ ............................ F02F 7/00; F01P 7/10; F02B 77/14
[52] U.S. Cl. ............................ 123/195 A; 123/41.49; 123/41.65; 180/232; 180/274
[58] Field of Search .............. 123/41.65, 41.66, 41.49, 123/195 A, 41.46; 180/274, 232

[56] References Cited

U.S. PATENT DOCUMENTS

| | | | |
|---|---|---|---|
| 2,985,157 | 5/1961 | Venediger | 123/41.65 X |
| 3,347,501 | 10/1967 | Eimeren | 180/232 |
| 3,362,243 | 1/1968 | Feguson | 123/41.65 X |
| 3,903,982 | 9/1974 | Van Wisen et al. | 180/232 |
| 4,031,978 | 6/1977 | Taylor | 180/232 |

FOREIGN PATENT DOCUMENTS 1012407  4/1952  France .............................. 123/41.65

Primary Examiner—Wendell E. Burns
Attorney, Agent, or Firm—Craig and Antonelli

[57] ABSTRACT

An arrangement for mounting driven or non-driven assemblies on or to an internal combustion engine mounted in a motor vehicle. The assemblies projecting forward beyond an end of the internal combustion engine when the engine is mounted in a front of the motor vehicle and projecting rearwardly beyond the engine when the engine is mounted in the rear of the motor vehicle. The assemblies are so mounted and/or fastened on or to the internal combustion engine that, in the event of a collision and/or an impact on the assemblies, such assemblies are displaceable in a direction of the internal combustion engine with a zero resistance and without expending any energy absorption.

4 Claims, 1 Drawing Figure

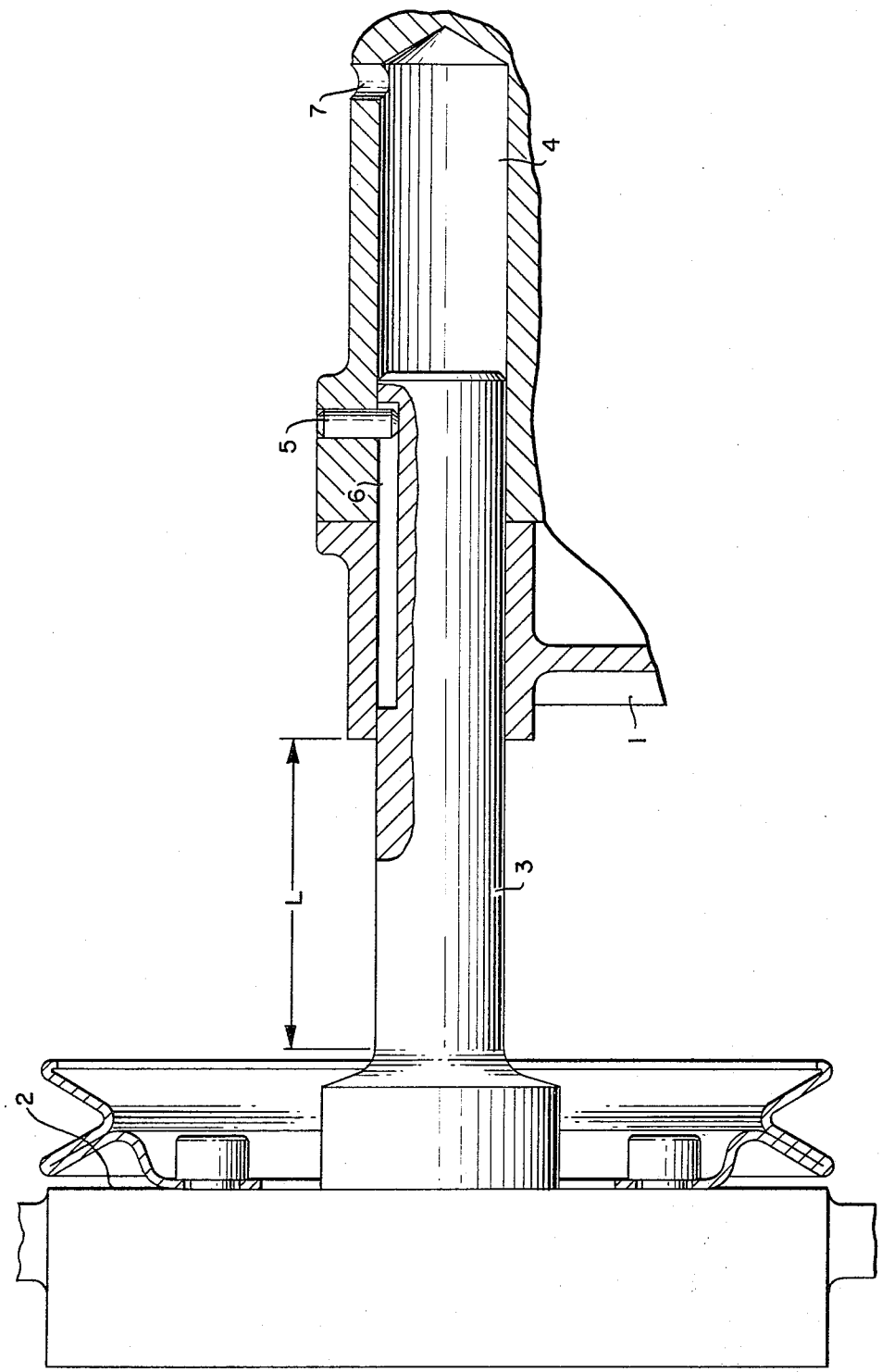

MOUNTING OR ATTACHING ARRANGEMENT FOR DRIVEN OR NON-DRIVEN ASSEMBLIES ASSOCIATED WITH AN INTERNAL COMBUSTION ENGINE

The present invention relates to an arrangement for mounting driven or non-driven assemblies mounted on or at an internal combustion engine which is arranged in a motor vehicle, which assemblies, when mounted on or at the engine, project forwardly beyond the engine when the engine is located at the front of the motor vehicle and project rearwardly beyond the engine when the engine is located at the rear of the motor vehicle.

The energy absorbing capability of the body of a motor vehicle in an area of the engine compartment offers the possibilities of absorbing impact energy in the event of an impact or collision. However, as far as the deformation path is concerned, such path is essentially limited by the internal combustion engine and, to a lesser extent, by the crankcase and cylinder block of the internal combustion engine and by the assemblies which are normally mounted on the front or side of the internal combustion engine and which project beyond the engine in a direction opposite to the direction of impact.

More particularly, with an in-line 6-cylinder internal combustion engine mounted at the front of the motor vehicle and aligned with a longitudinal axis thereof, with assemblies mounted on the engine and projecting forwardly beyond the engine, the so-called "hard length" of the internal combustion engine is considerable so that, in the event of a collision, the deformation possibilities of the vehicle body cannot be fully utilized.

The aim underlying the present invention essentially resides in providing an arrangement for attaching or mounting a driven or non-driven assemblies on or to an internal combustion engine such that, in the event of a collision or predetermined impact on the assemblies, such assemblies are displaceable, without resistance, in a direction toward the internal combustion engine.

By virtue of a zero resistance displacement of the assemblies, in which, as a rule, only a slight bearing friction of no practical significance need be overcome, but with no energy absorption being required, the deformability of the vehicle body may be utilized to the point where the cylinder block or crankcase of the internal combustion engine delimits any further deformation.

In accordance with the present invention, with the assembly being, for example, a projecting fan of the internal combustion engine, such fan may be mounted on a shaft so that it is displaceable in a direction toward the internal combustion engine.

Accordingly, it is an object of the present invention to provide an arrangement for attaching or mounting driven or non-driven assemblies on or to an internal combustion engine which reduces the so-called "hard length" of the internal combustion engine produced by the projecting assemblies.

Another object of the present invention resides in providing an arrangement for attaching or mounting driven or non-driven assemblies on or to an internal combustion engine which maximizes the utilization of the energy absorbing capabilities of a body of the motor vehicle in which the internal combustion engine is arranged.

Yet another object of the present invention resides in providing an arrangement for attaching or mounting driven or non-driven assemblies on or to an internal combustion engine which is simple in construction and therefore relatively inexpensive to manufacture.

A further object of the present invention resides in providing an arrangement for attaching or mounting driven or non-driven assemblies on or to an internal combustion engine which functions reliably under all operating conditions.

These and other objects, features, and advantages of the present invention will become more apparent from the following description when taken in connection with the accompanying drawing which shows, for the purposes of illustration only, one embodiment in accordance with the present invention, and wherein:

The single FIGURE of the drawing is a partially schematic cross-sectional view of an arrangement for attaching or mounting a fan at an internal combustion engine in accordance with the present invention.

Referring now to the single FIGURE of the drawings, according to such FIGURE, a fan 2 is rotatably mounted on a shaft 3 and projects from a housing 1 of an internal combustion engine with the fan being disposed in front of a heat exchanger or radiator (not shown). The shaft 3 is mounted so as to be longitudinally displaceable in a bore 4 provided in the housing 1 of the internal combustion engine. A pin 5 is provided for preventing the shaft from rotating with the pin 5 engaging a longitudinal groove 6 in the shaft 3.

A venting hole 7 or the like is provided for communicating the bore 4 with the atmosphere. The bore 4 has a length such that, in the event of a collision or impact on the fan 2, the fan 2 together with the shaft 3 can be displaced through a distance L with practically zero resistance against the housing 1 whereby the shaft 3 is forced further into the bore 4. Thus, the "hard length" of the internal combustion engine is thereby reduced by the distance L.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. An arrangement for mounting driven or non-driven assemblies on an internal combustion engine disposed in an engine compartment of a motor vehicle, the assemblies projecting forwardly of the engine when the engine is mounted at a front of the motor vehicle and projecting rearwardly when the engine is mounted at a rear of the vehicle, characterized in that the mounting arrangement includes means for mounting the assemblies on the internal combustion engine so that the assemblies can be displaced in a direction toward the internal combustion engine substantially without any resistance upon an application of a predetermined impact force on the assemblies whereby the "hard length" of the internal combustion engine is reduced so that the energy absorbing capabilities of the body of the motor vehicle may be more fully utilized in the event of an impact.

2. An arrangement according to claim 1, characterized in that one of the assemblies is a cooling fan, and in that the mounting means includes a shaft having the fan rotatably mounted thereon, and means provided in a housing of the internal combustion engine for accommodating the shaft when the fan is displaced by an impact force acting thereon.

3. An arrangement according to claim 2, characterized in that said accommodating means is a bore provided in the housing, means are provided for venting said bore to the atmosphere, and in that means are cooperable with said shaft for preventing a rotation of said shaft.

4. An arrangement according to claim 3, characterized in that said preventing means includes a pin means disposed in a housing cooperable with a longitudinal groove provided in the shaft.

* * * * *